United States Patent [19]
Ito et al.

[11] 3,725,484
[45] Apr. 3, 1973

[54] METHOD FOR OXIDIZING ALKYLATED AROMATIC COMPOUNDS

[75] Inventors: Ken Ito; Hiroshi Kaminaka, both of Toyonaka-shi; Norio Kotera, Amagasaki-shi; Shinji Yamamoto, Nishinomiya-shi; Iwao Dogane, Nishinomiya-shi; Kosuke Shigehiro, Nishinomiya-shi; Hiroshi Kuruma, Takarazuka-shi; Takashi Chinuki, Yoyonaka-shi; Hiroshi Yoshitake; Kenji Tanimoto, both of Minoo-shi; Shinichi Hasegawa, Amagasaki-shi; Nobuki Kobayashi, Fukushima-ku, Osaka, all of Japan

[73] Assignee: Sumitomo Chemical Company, Ltd., Osaka, Japan

[22] Filed: Feb. 21, 1968

[21] Appl. No.: 707,304

[30] Foreign Application Priority Data

Feb. 25, 1967 Japan..................................42/12159

[52] U.S. Cl........260/610 B, 260/465 F, 260/515 R, 260/592, 260/473 R

[51] Int. Cl................................................C07c 73/08
[58] Field of Search............260/610 B, 465 A, 610 A

[56] References Cited

UNITED STATES PATENTS

| | | | |
|---|---|---|---|
| 2,302,466 | 11/1942 | Palmer et al......................260/610 X |
| 2,664,447 | 12/1953 | Lorand et al.........................260/610 |
| 2,751,418 | 6/1956 | Enos.....................................260/610 |
| 3,190,924 | 6/1965 | Sodomann et al....................260/610 |
| 3,259,661 | 7/1966 | Ester et al. ...........................260/610 |

*Primary Examiner*—Bernard Helfin
*Assistant Examiner*—W. B. Lone
*Attorney*—Stevens, Davis, Miller & Mosher

[57] ABSTRACT

Hydroperoxides of alkylaromatic compounds are prepared by contacting the alkylaromatic compounds having at least one alkyl or cycloalkyl substituent group having a tertiary carbon atom in the $\alpha$-position with respect to the aromatic nucleus, with oxygen or a molecular oxygen-containing gas in the presence of 0.001 to 10 percent by weight of molybdenum disulfide at room temperature to 200°C. for 1 to 100 hours.

7 Claims, No Drawings

METHOD FOR OXIDIZING ALKYLATED AROMATIC COMPOUNDS

This invention relates to a method for oxidizing alkylaromatic compounds in which alkylaromatic compounds are subjected to oxidation to obtain the corresponding alkylaromatic hydroperoxides.

Hydroperoxides of alkylaromatic compounds, particularly hydroperoxides of alkylaromatic hydrocarbons, are very useful compounds as a catalyst or an initiator particularly the polymerization reactions and autoxidation based on the radical reaction or as an oxidizing agent for the manufacture of epoxy compounds or other oxidation reactions. In particular, it has been well known that the hydroperoxides of alkylaromatic hydrocarbons play an important role as intermediates for the manufacture of phenolic compounds. Further, recent advances in chemical synthesis are more and more extending the applicable fields of the hydroperoxides and consequently the hydroperoxides are taking more and more important positions in the chemical industry.

The hydroperoxides of alkylaromatic hydrocarbons have been commercially prepared by contacting the corresponding alkylaromatic hydrocarbons with oxygen or a molecular oxygen-containing gas at an elevated temperature. More particularly, the following two types of processes are well known in preparing the hydroperoxides. That is, one is the so-called "direct oxidation process" wherein the reaction is carried out in a homogeneous phase of starting material hydrocarbon, and the other is the so-called "emulsion oxidation process", wherein the reaction is carried out in a water-oil dispersion system after the starting material hydrocarbon has been emulsified with water and an emulsifying agent. However in both types of processes, there is the disadvantage that very long periods of reaction time are required for the oxidation. Further, a number of methods for shortening the reaction time by adding a suitable oxidation accelerator to the reaction system have been heretofore proposed. For example, Japanese Pat. Publication Nos. 3618/1952, 5014/1953, 6031/1954 and 636/1957 disclosed such methods, but in the proposed methods the oxidation is usually carried out non-catalytically.

The compounds of heavy metals such as cobalt, manganese, copper, vanadium, etc., which are usually used in the oxidation reaction for the preparation of carboxylic acids or carbonyl compounds, are not usually used as catalysts in the oxidation reaction for the preparation of hydroperoxides. This is because, when these compounds are used as catalysts, though the oxidation rate is greatly accelerated, the formed hydroperoxides are rapidly decomposed to form undesirable carbonyl compounds or carbinols, etc., and as a result the desired hydroperoxides are inevitably produced in a very low yield. Catalysts free of the disadvantages incurred with the use of such heavy metal catalysts, that is, catalysts having a high oxidation-accelerating effect and an extremely repressed activity for decomposing the hydroperoxides to the above-mentioned compounds are commercially rarely available. That is, only cobalt amine complex salt and copper phthalocyanine have been practicably usable. The reason for the difficulty seems to be that the oxidation-accelerating action and the hydroperoxide-decomposing action of the heavy metal catalysts take place simultaneously and it is very difficult to repress only hydroperoxide-decomposing action.

Comparison of the oxidation of cumene in the presence of a heavy metal catalyst, for example, cupric acetate, with non-catalytic oxidation reveals the following facts: when the oxidation is conducted in the presence of the catalyst, the concentration of $\alpha,\alpha$-dimethylbenzyl hydroperoxide is rapidly increased at the initial stage; the reaction rate reaches several times that of the non-catalytic reaction; and then the concentration of hydroperoxide reaches a maximum and then is rapidly reduced. A large amount of acetophenone is detected in the mixture resulting from the completion of the reaction. On the other hand, in the case of the non-catalytic oxidation, the hydroperoxide-accumulating rate is low, but the maximum attainable concentration of the $\alpha,\alpha$-dimethylbenzyl hydroperoxide is very high, as compared with that when the cupric salt catalyst is used. For example, the maximum concentration often reaches two or more times the maximum concentration attained in the catalytic oxidation. Then, the concentration of hydroperoxide is very slowly decreased.

The present inventors have conducted research to find a catalyst capable of only accelerating the formation of desired hydroperoxide without any appreciable side reactions such as the decomposition of hydroperoxides to the corresponding ketones or carbinols in preparing alkylaromatic hydroperoxides by oxidizing the corresponding alkylaromatic compounds.

As the result, the present inventors have found that molybdenum disulfide has very unique properties as a catalyst for the desired oxidation reaction. That is, when alkylaromatic compounds are contacted with oxygen or a molecular oxygen-containing gas at room temperature or at an elevated temperature in the presence of a small amount of molybdenum disulfide, the hydroperoxide-accumulating rate is considerably increased, and the hydroperoxides can be accumulated to substantially the same maximum concentration as attained in the non-catalytic oxidation reaction. Further, when molybdenum disulfide catalyst is used such phenomena as the decomposition of hydroperoxides being too rapid to obtain the reaction mixture containing a high concentration of the hydroperoxides, as in the case with said copper salt catalyst, are not observed at all.

One object of the present invention is to provide a method for oxidizing alkylaromatic compounds having at least one primary or secondary alkyl substituent having 2 to 6 carbon atoms or mixtures thereof in the presence of a catalyst in a shortened period of reaction time and in a high yield without decreasing the concentration of the formed alkylaromatic hydroperoxides.

Other objects of the present invention will be apparent from the following description.

In order to accomplish these objects, the present invention provides a method for oxidizing alkylaromatic compounds, which comprises contacting an alkylaromatic compound having at least one primary or secondary alkyl group having 2 to 6 carbon atoms directly attached to the aromatic ring with oxygen or molecular oxygen-containing gas in the presence of molybdenum disulfide to obtain the corresponding alkylaromatic hydroperoxide.

According to the present invention, alkylaromatic compounds are oxidized at the carbon atom of the α-position to the aromatic nuclei of said primary or secondary alkyl group having 2 to 6 carbon atoms to yield the corresponding alkylaromatic hydroperoxides.

The oxidation of the present invention is carried out according to such conventional methods as disclosed, for example, in the specification of Japanese Pat. Publication No. 3618/1952, except that molybdenum disulfide is used as the catalyst. That is, an alkylaromatic compound having at least one primary or secondary alkyl group having 2 to 6 carbon atoms, molybdenum disulfide and, if desired, a reaction medium for example such as, benzene, an alkali such as sodium carbonate, and in the case of emulsion oxidation, an emulsifier such as sodium stearate, and, if desired, a reaction initiator such as the corresponding hydroperoxide, azobisisobutyronitrile or benzoyl peroxide are mixed in a reaction vessel. The temperature of the reaction mixture is elevated in many cases. Oxygen or a molecular oxygen-containing gas is introduced into the vessel, whereby the alkylaromatic compound is oxidized. After the reaction is completed, the catalyst used in the oxidation is removed by, for example, filtration or decantation, and the reaction mixture is treated in a conventional manner to separate the desired alkylaromatic hydroperoxide from the reaction mixture or the reaction mixture may be employed for various uses as it is.

Molybdenum disulfide used in the present invention as an oxidation-accelerating catalyst is a compound widely available as a solid lubricating agent, but few attempts have been heretofore made to utilize molybdenum disulfide as a catalyst for chemical reaction. Particularly, any application of molybdenum disulfide to oxidation reactions has not been heretofore attempted.

Molybdenum disulfide, which is quite a new type of oxidation catalyst, is a solid insoluble in ordinary organic solvents or water. The molybdenum disulfide per se can be evenly dispersed in the reaction system by normal stirring, because it is usually commercially available as very fine particles or powders. The solid molybdenum disulfide can be very easily introduced into the reaction system, because molybdenum disulfide itself has a lubricating action as mentioned above. That is, it is possible to suspend the molybdenum disulfide in the alkylaromatic compound or reaction medium to be fed and introduce the resulting suspension, as it is, into the reaction system using a slurry pump or other means without any erosion or other damages of pump or valves. More advantageously, the powdery molybdenum disulfide per se or in a kneaded mixture with grease, etc. can be introduced under pressure into the reaction system. Further, the molybdenum disulfide can be substantially recovered from the product solution by either leaving the product solution still to settle the catalyst, or filtering the solution.

The alkylaromatic compounds employed in the present invention are compounds having at least one alkyl or cycloalkyl substituent group having a tertiary carbon atom in the α-position with respect to the aromatic nucleus as the alkyl group to be oxidized. The aromatic nucleus may have one or more other alkyl groups which are the same as or different from said above described alkyl group, for example methyl and tert.-butyl and/or other substituent group, for example, halogen atom, alkoxycarbonyl group, hydroxycarbonyl group, acyl group, cyano group, alkoxy group, halogenated X-alkyl group, phenyl group, substituted phenyl group, etc. or not. For example, the present alkylaromatic compounds include such aromatic hydrocarbons as ethylbenzene, cumene, secondary butylbenzene, isobutylbenzene, isopropyltoluene isomers, diisopropylbenzene isomers, isopropylxylene isomers, secondary butylxylene isomers, tertiary butylcumene isomers, cyclohexylbenzene, isopropylnaphthalene isomers, secondary butylnaphthalene isomers, etc., and isomers of such aromatic compounds as isopropylbenzoic acids and their esters isopropyl acetophenone, isopropylbenzonitrile, methoxycumene, secondary butylbenzyl chloride, isopropyl chlorobenzene, etc., and their mixtures.

A temperature range suitable for carrying out the present invention is from room temperature to 200°C., preferably 60° to 140°C. Preferable pressure of oxygen or molecular oxygen-containing gas is atmospheric or an elevated pressure, but reduced pressure can be employed. As the molecular oxygen-containing gas air can be used. The molecular oxygen-containing gas must be used after removing acidic materials. Oxygen is require at least in stoichiometric amount. Either the "direct oxidation process" or "emulsion oxidation process" can be also employed in the present invention. The oxidation reaction time substantially depends upon the oxidizability of the alkylaromatic compound, the stability of the formed hydroperoxide and the desired concentration of the hydroperoxide, but usually ranges from about 1 to about 100 hours. Suitable concentration of the catalyst molybdenum disulfide is 0.001 to 10 percent by weight, preferably 0.005 to 1 percent by weight based on the weight of the reaction mixture.

If there remains unreacted alkylated aromatic compound after the reaction, the unreacted alkylaromatic compound is separated from the reaction mixture in a conventionally suitable manner. As the result, the yield of the formed hydroperoxide by the oxidation of the present invention is quite satisfactory based on the amount of the consumed alkylaromatic compound.

By applying the present invention to the preparation of alkylaromatic hydroperoxides by oxidizing the corresponding alkylaromatic compounds, the oxidation reaction rate, e.g. the hydroperoxide-forming rate can be greatly accelerated and the decomposition of the formed hydroperoxides can be substantially repressed contrary to the case where conventional heavy metal catalyst is employed. Further, the hydroperoxides can be accumulated to substantially same maximum concentration as attained in non-catalytic oxidation. Accordingly, the reaction time can be shortened and the production capacity of the reactor can be greatly enhanced. Furthermore, as mentioned above, the molybdenum disulfide catalyst can be easily added to or removed from the reaction system. This feature is particularly advantageous when the catalyst is to be continuously added to a continuous reactor or to be added to a high pressure reaction system.

As explained above, the present invention is characterized in that the oxidation of alkylaromatic compounds having at least one primary or secondary alkyl substituent having 2 to 6 carbon atoms to the corresponding alkylaromatic hydroperoxide can be rapidly and advantageously carried out by adding molybdenum disulfide to the reaction system as a novel type of reaction accelerator. The advantageousness of the present invention will be obvious from the following Examples wherein the hydroperoxide-accumulating rate and the maximum concentration of the accumulated hydroperoxide are shown in comparison with the case wherein no molybdenum disulfide is employed.

The following Examples are set forth to illustrate the present invention which is not limited to them. All percentages are based on weight.

EXAMPLE 1

One hundred twenty g. of cumene purified with sulfuric acid and alkali in advance was placed into a round bottom glass flask provided with a stirrer, thermometer, reflux coller and gas inlet. Then, 1 g. of sodium carbonate, 0.5 g. of cumene hydroperoxide, and 0.05 g. of molybdenum disulfide were thereto added. The resulting mixture was heated to 110°C. and an oxygen gas was introduced thereto while stirring the mixture well. The concentration of the formed α,α-dimethylbenzyl hydroperoxide was measured every hour according to the iodine method. The analysis revealed that the concentration of hydroperoxide reached a maximum of 33 percent after 6 hours. When the oxidation was conducted at the same conditions without adding molybdenum disulfide, the concentration of hydroperoxide reached a maximum of 34 percent after 13 hours from the start of the reaction.

EXAMPLE 2

Two hundred g. of deionized water, 34 g. of cymene isomer mixtures (O-isomer: 4%, m-isomer: 62%, p-isomer: 34%), 3 g. of sodium carbonate, 0.1 g. of sodium stearate and a 1 g. of azobisisobutyronitrile were placed in a flask similar to that of Example 1, and 0.3 g. of a mixture consisting of one part by weight of molybdenum disulfide and 4 parts by weight of silicone grease were added thereto. The content of the flask was vigorously stirred at 85°C. while passing air therethrough. A sample was taken out every 4 hours and subjected to centrifugal separation, and the total peroxide concentration in an oil layer was quantitatively determined. The analysis revealed that the concentration reached a maximum of 42 percent after 16 hours and was kept at almost the same level thereafter. On the other hand, where no molybdenum disulfide-silicone grease mixture was added, the concentration reached a maximum of 41 percent after 40 hours and was kept at the same level thereafter.

EXAMPLE 3

0.1 g. of the same molybdenum disulfide-grease mixture as used in Example 2 was added to a mixture consisting of 29 g. of p-isopropylbenzonitrile, 0.1 g. calcium oxide, and 0.05 g. of benzoyl peroxide, and the resulting mixture was subjected to oxidation with oxygen at 105°C. The concentration of formed α,α-dimethyl-p-cyanobenzyl hydroperoxide reached 32 percent after 10 hours, whereas in the case where no molybdenum disulfide-containing grease is added, the concentration reached only 18 percent in the same time interval.

EXAMPLE 4

15.0 g. of deionized water, 150 g. of secondary butyl naphthalene isomer (1-isomer: 3%, 2-isomer: 97%), 0.1 g. of potassium laurate, 1.0 g. of α,α-dimethylbenzyl hydroperoxide and 1.5 g. of potassium carbonate were placed in a flask similar to that of Example 1, and 0.05 g. of molybdenum disulfide was added thereto. The content of the flask was vigorously stirred at 95°C. while passing air therethrough. The concentration of formed α-methyl-α[1-and 2-naphthyl]-propyl hydroperoxides was measured every 4 hours. The analysis revealed that the concentration reached 38 percent after 16 hours. On the other hand, where no molybdenum disulfide was added, the same concentration of the hydroperoxides was attained after 40 hours.

What we claim is:

1. A method for oxidizing an alkyl-aromatic hydrocarbon selected from the group consisting of benzene and napthalene having at least one alkyl substituent group containing 2 to 6 carbon atoms directly attached to the aromatic ring, said alkyl substituent group having a secondary or tertiary carbon atom in the α-position with respect to the aromatic ring, which comprises contacting said alkylaromatic hydrocarbon with at least a stoichiometric amount of oxygen of a molecular oxygen-containing gas at a temperature from room temperature to 200°C in the presence of 0.001 to 10 percent by weight of molybdenum disulfide based on the weight of the total amount of the reaction mixture to obtain the corresponding aralkyl hydroperoxide.

2. A method according to claim 1, wherein 0.005 to 1 percent by weight of molybdenum disulfide is used.

3. A method according to claim 1, wherein the alkylaromatic hydrocarbon is cymene.

4. A method according to claim 1, wherein the alkylaromatic hydrocarbon is a mixture of cymene isomers.

5. A method according to claim 1, wherein the aklylaromatic hydrocarbon is secondary butyl-naphthalene.

6. A method according to claim 1, wherein the oxidation is carried out at a temperature from 60° to 140°C.

7. In the method for oxidizing an alkylaromatic hydrocarbon selected from the group consisting of benzene and naphthalene having at least one alkyl substituent group containing 2 to 6 carbon atoms directly attached to the aromatic ring, said alkyl substituent group having a secondary or tertiary carbon atom in the α-position with respect to an aromatic ring, which comprises contacting said hydrocarbon with at least a stoichiometric amount of oxygen or a molecular oxygen-containing gas to obtain the corresponding aralkyl hydroperoxide, the improvement comprising using 0.001 to 10 percent by weight of molybdenum disulfide as the catalyst at a temperature from room temperature to 200°C.

* * * * *